United States Patent
Nakajima

(10) Patent No.: US 8,239,666 B2
(45) Date of Patent: Aug. 7, 2012

(54) SYSTEM FOR MANAGING HARDWARE RESOURCES, COMPUTER SYSTEM, METHOD FOR MANAGING HARDWARE RESOURCES, AND PROGRAM

(75) Inventor: Eiji Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 12/536,041

(22) Filed: Aug. 5, 2009

(65) Prior Publication Data

US 2010/0037327 A1 Feb. 11, 2010

(30) Foreign Application Priority Data

Aug. 7, 2008 (JP) .................................. 2008-204160

(51) Int. Cl.
*G06F 9/00* (2006.01)

(52) U.S. Cl. .......................................................... 713/2

(58) Field of Classification Search ..................... 713/2
See application file for complete search history.

(56) References Cited

FOREIGN PATENT DOCUMENTS

| JP | 7-219806 A | 8/1995 |
|---|---|---|
| JP | 2002312689 A | 10/2002 |
| JP | 2004227585 A | 8/2004 |
| JP | 2007307813 A | 11/2007 |

OTHER PUBLICATIONS

Japanese Office Action for JP2008-204160 issued May 11, 2010.

*Primary Examiner* — Kambiz Zand
*Assistant Examiner* — Teshome Hailu

(57) ABSTRACT

A system for managing hardware resources includes a computer system and a management server, wherein the computer system includes a static authentication key generation unit that generates authentication keys for the detected hardware resources, a dynamic authentication key generation unit that requests arrangements of a hardware resource and an activation key to the management server by transmitting a dynamic installation authentication key generated from a system authentication key, a first additional hardware resource authentication unit that judges whether or not a new hardware resource is unauthorized by comparing the authentication key with the activation key, and a second additional hardware resource authentication unit that judges whether or not the new hardware resource fit the computer system by comparing the dynamic installation authentication key with the activation key, and wherein the management server includes an activation key generation unit that transmits the activation key to the computer system.

19 Claims, 15 Drawing Sheets

FIG.9

SOCKET AUTHENTICATION KEY

| socket authentication key's unique ID | | | | | | | |
|---|---|---|---|---|---|---|---|
| BIOS Revision | type of socket | stepping | unique ID | operation frequency | cache size | physical location number | logical number |

FIG.10

CPU AUTHENTICATION KEY

| socket authentication key's unique ID | CPU authentication key's unique ID |
|---|---|
| CPU core number in socket | CPU thread number in CPU core |

FIG.11

MEMORY AUTHENTICATION KEY

| socket authentication key's unique ID | | memory authentication key's unique ID | |
|---|---|---|---|
| type of DIMM | speed | manufacturer/vendor name | serial number |

FIG.12

SYSTEM AUTHENTICATION KEY

| system authentication key's unique ID | | | | | |
|---|---|---|---|---|---|
| unique serial number of computer system | | | | | |
| socket authentication key's unique ID | | | | | |
| BIOS Revision | type of socket | stepping | unique ID | operation frequency | cache size |
| CPU authentication key's unique ID | | | | | |
| CPU core number in socket | | | CPU thread number in CPU core | | |
| CPU authentication key's unique ID | | | | | |

⋮

| memory authentication key's unique ID | | | |
|---|---|---|---|
| type of DIMM | speed | manufacturer/vendor name | serial number |
| memory authentication key's unique ID | | | |

⋮ socket authentication key's unique ID

⋮ socket authentication key's unique ID

⋮ bitmap of physical location number of socket bitmap of logical number of socket

FIG.13

SOCKET DYNAMIC INSTALLATION AUTHENTICATION KEY

| socket dynamic authentication key's unique ID |
| unique serial number of computer system |

| BIOS Revision | type of socket | stepping | unique ID | operation frequency | cache size | physical location number | logical number | new arrangement need indicating flag  OFF(0): arrangements are not necessary,  ON(1): arrangements are necessary

FIG.14

ACTIVATION KEY

| socket dynamic authentication key's unique ID |
|---|

| unique serial number of computer system |
|---|

| BIOS Revision | type of socket | stepping | unique ID | operation frequency | cache size | physical location number | logical number |
|---|---|---|---|---|---|---|---| installation recognition flag  OFF(0): not recognized, ON(1): recognized

FIG.15

SOCKET ACCOUNTING KEY

| socket accounting key's unique ID | | | | | | | |
| unique serial number of computer system | | | | | | | |
| BIOS Revision | type of socket | stepping | unique ID | operation frequency | cache size | physical location number | logical number |
| Aaccounting start flag OFF(0): accounting is not started, ON(1): accounting is started | | | | | | | |

FIG.16

HW RESOURCE AUTHENTICATION TABLE

| SYSTEM AUTHENTICATION KEY | |
|---|---|
| SOCKET AUTHENTICATION KEY | accounting flag OFF(0): has not been accounted, ON(1): has been accounted |
| CPU AUTHENTICATION KEY | accounting flag OFF(0): has not been accounted, ON(1): has been accounted |
| CPU AUTHENTICATION KEY | accounting flag OFF(0): has not been accounted, ON(1): has been accounted |
| ... | |
| MEMORY AUTHENTICATION KEY | accounting flag OFF(0): has not been accounted, ON(1): has been accounted |
| MEMORY AUTHENTICATION KEY | accounting flag OFF(0): has not been accounted, ON(1): has been accounted |
| ... | |
| SOCKET AUTHENTICATION KEY | accounting flag OFF(0): has not been accounted, ON(1): has been accounted |
| ... | |
| SOCKET AUTHENTICATION KEY | accounting flag OFF(0): has not been accounted, ON(1): has been accounted |
| ... | |

SYSTEM FOR MANAGING HARDWARE RESOURCES, COMPUTER SYSTEM, METHOD FOR MANAGING HARDWARE RESOURCES, AND PROGRAM

This application is based upon and claims the benefit of priority from Japanese patent application No. 2008-204160, filed on Aug. 7, 2008, the disclosure of which is incorporated herein in its entirety by reference.

TECHNICAL FILED

The present invention relates to a system for managing hardware resources which manages a hardware resource (HW resource) provided in a computer system.

BACKGROUND ART

An example of the technology for managing HW resources installed in a computer system is disclosed in Japanese Patent Application Laid-Open No. 2002-312689. In the invention disclosed in Japanese Patent Application Laid-Open No. 2002-312689, when a user of the computer system finds a shortage of memory capacity in a data storage device, the user requests the owner of the computer system to add an additional disk device(s) and the owner adds the disk device(s) in response to the request.

SUMMARY

An exemplary object of the invention is to provide a system for managing HW resources with which not only installation of an unauthorized HW resource in the computer system but also the installation of the HW resource that does not fit the computer system can be avoided by using an activation key.

A system for managing hardware resources according to an exemplary aspect of the invention includes a computer system, and a management server, wherein the computer system includes a static authentication key generation unit that detects hardware resources mounted on the computer system and generates authentication keys including attribute information on the detected hardware resources, respectively, a dynamic authentication key generation unit that requests arrangements of a hardware resource and transmission of an activation key to the management server by extracting the authentication key related to a hardware resource whose type is instructed by an adding instruction from a system authentication key that is a set of the authentication keys of the hardware resources installed in the computer system, generating a dynamic installation authentication key including attribute information included in the extracted authentication key and transmitting the dynamic installation authentication key to the management server, a first additional hardware resource authentication unit that judges whether or not a new hardware resource is an unauthorized hardware resource which is not permitted to be installed by comparing the authentication key of the new hardware resource generated by the static authentication key generation unit with the activation key sent from the management server at the time of addition of the new hardware resource, and a second additional hardware resource authentication unit that judges whether or not the new hardware resource is a hardware resource which does not fit the computer system by comparing the dynamic installation authentication key generated by the dynamic authentication key generation unit with the activation key sent from the management server at the time of addition of the new hardware resource, and wherein the management server includes an activation key generation unit that transmits the activation key including attribute information included in the dynamic installation authentication key sent from the computer system, to the computer system.

A computer system according to an exemplary aspect of the invention includes a static authentication key generation unit that detects hardware resources mounted on the computer system and generates authentication keys including attribute information the detected hardware resources, respectively, a dynamic authentication key generation unit that requests arrangements of a hardware resource and transmission of an activation key to the management server by extracting the authentication key related to a hardware resource whose type is instructed by an adding instruction from a system authentication key that is a set of the authentication keys of hardware resources installed in the computer system, generating a dynamic installation authentication key including attribute information included in the extracted authentication key and transmitting the dynamic installation authentication key to the management server, a first additional hardware resource authentication unit that judges whether or not a new hardware resource is an unauthorized hardware resource which is not permitted to be installed by comparing the authentication key of the new hardware resource generated by the static authentication key generation unit with the activation key sent from the management server at the time of addition of the new hardware resource, and a second additional hardware resource authentication unit that judges whether or not the new hardware resource is a hardware resource which does not fit the computer system by comparing the dynamic installation authentication key generated by the dynamic authentication key generation unit with the activation key sent from the management server at the time of addition of the new hardware resource.

A method for managing hardware resources according to an exemplary aspect of the invention includes detecting hardware resources mounted on a computer system at the time of booting of said computer system and generating authentication keys including attribute information on the detected hardware resources, respectively in the computer system, requesting arrangements of a hardware resource and transmission of an activation key to a management server by extracting the authentication key related to a hardware resource whose type is instructed by an adding instruction from a system authentication key that is a set of the authentication keys of the hardware resources installed in the computer system, generating a dynamic installation authentication key including attribute information included in the extracted authentication key and transmitting the dynamic installation authentication key to the management server in the computer system, transmitting the activation key including attribute information included in the dynamic installation authentication key sent from the computer system, to the computer system in the management server, judging whether or not a new hardware resource is an unauthorized hardware resource which is not permitted to be installed by comparing the authentication key of the new hardware resource with the activation key sent from the management server at the time of addition of the new hardware resource in the computer system, and judging whether or not the new hardware resource is a hardware resource which does not fit the computer system by comparing the dynamic installation authentication key with the activation key sent from the management server at the time of addition of the new hardware resource in the computer system.

A computer readable medium recording thereon a program, causing a computer to perform a method according to an exemplary aspect of the invention includes detecting hardware resources mounted on a computer system and generating authentication keys including attribute information on the detected hardware resources, respectively, requesting arrangements of a hardware resource and transmission of an activation key to a management server by extracting the authentication key related to a hardware resource whose type is instructed by an adding instruction from a system authentication key that is a set of the authentication keys of the hardware resources installed in the computer system, generating a dynamic installation authentication key including attribute information included in the extracted authentication key and transmitting the dynamic installation authentication key to the management server, judging whether or not a new hardware resource is an unauthorized hardware resource which is not permitted to be installed by comparing the authentication key of the new hardware resource generated by the static authentication key generation unit with the activation key sent from the management server at the time of addition of the new hardware resource, and judging whether or not the new hardware resource is a hardware resource which does not fit the computer system by comparing the dynamic installation authentication key generated by the dynamic authentication key generation unit with the activation key sent from the management server at the time of addition of the new hardware resource.

A system for managing hardware resources according to an exemplary aspect of the invention includes a computer system, and a management server, wherein the computer system includes a static authentication key generation means for detecting hardware resources mounted on the computer system and generating authentication keys including attribute information on the detected hardware resources, respectively, a dynamic authentication key generation means for requesting arrangements of a hardware resource and transmission of an activation key to the management server by extracting the authentication key related to a hardware resource whose type is instructed by an adding instruction from a system authentication key that is a set of the authentication keys of the hardware resources installed in the computer system, generating a dynamic installation authentication key including attribute information included in the extracted authentication key and transmitting the dynamic installation authentication key to the management server, a first additional hardware resource authentication means for judging whether or not a new hardware resource is an unauthorized hardware resource which is not permitted to be installed by comparing the authentication key of the new hardware resource generated by the static authentication key generation means with the activation key sent from the management server at the time of addition of the new hardware resource, and a second additional hardware resource authentication means for judging whether or not the new hardware resource is a hardware resource which does not fit the computer system by comparing the dynamic installation authentication key generated by the dynamic authentication key generation means with the activation key sent from the management server at the time of addition of the new hardware resource, and wherein the management server includes an activation key generation means for transmitting the activation key including attribute information included in the dynamic installation authentication key sent from the computer system, to the computer system.

A method for managing hardware resources according to an exemplary aspect of the invention includes a step for detecting hardware resources mounted on a computer system at the time of booting of the computer system and generating authentication keys including attribute information on the detected hardware resources, respectively in the computer system, a step for requesting arrangements of a hardware resource and transmission of an activation key to a management server by extracting the authentication key related to a hardware resource whose type is instructed by an adding instruction from a system authentication key that is a set of the authentication keys of the hardware resources installed in the computer system, generating a dynamic installation authentication key including attribute information included in the extracted authentication key and transmitting the dynamic installation authentication key to the management server in the computer system, a step for transmitting the activation key including attribute information included in the dynamic installation authentication key sent from the computer system, to the computer system in the management server, a step for judging whether or not a new hardware resource is an unauthorized hardware resource which is not permitted to be installed by comparing the authentication key of the new hardware resource with the activation key sent from the management server at the time of addition of the new hardware resource in the computer system, and a step for judging whether or not the new hardware resource is a hardware resource which does not fit the computer system by comparing the dynamic installation authentication key with the activation key sent from the management server at the time of addition of the new hardware resource in the computer system.

BRIEF DESCRIPTION OF THE DRAWINGS

Exemplary features and advantages of the present invention will become apparent from the following detailed description when taken with the accompanying drawings in which:

FIG. 9 is an exemplary diagram showing an example of a socket authentication key.

FIG. 10 is an exemplary diagram showing an example of a CPU authentication key.

FIG. 11 is an exemplary diagram showing an example of a memory authentication key.

FIG. 12 is an exemplary diagram showing an example of a system authentication key.

FIG. 13 is an exemplary diagram showing an example of a socket dynamic installation authentication key.

FIG. 14 is an exemplary diagram showing an example of an activation key.

FIG. 15 is an exemplary diagram showing an example of a socket accounting key.

FIG. 16 is an exemplary diagram showing an example of HW resource authentication table 109.

EXEMPLARY EMBODIMENT

Next, an exemplary embodiment will be described in detail with reference to drawings.

Figure 1:
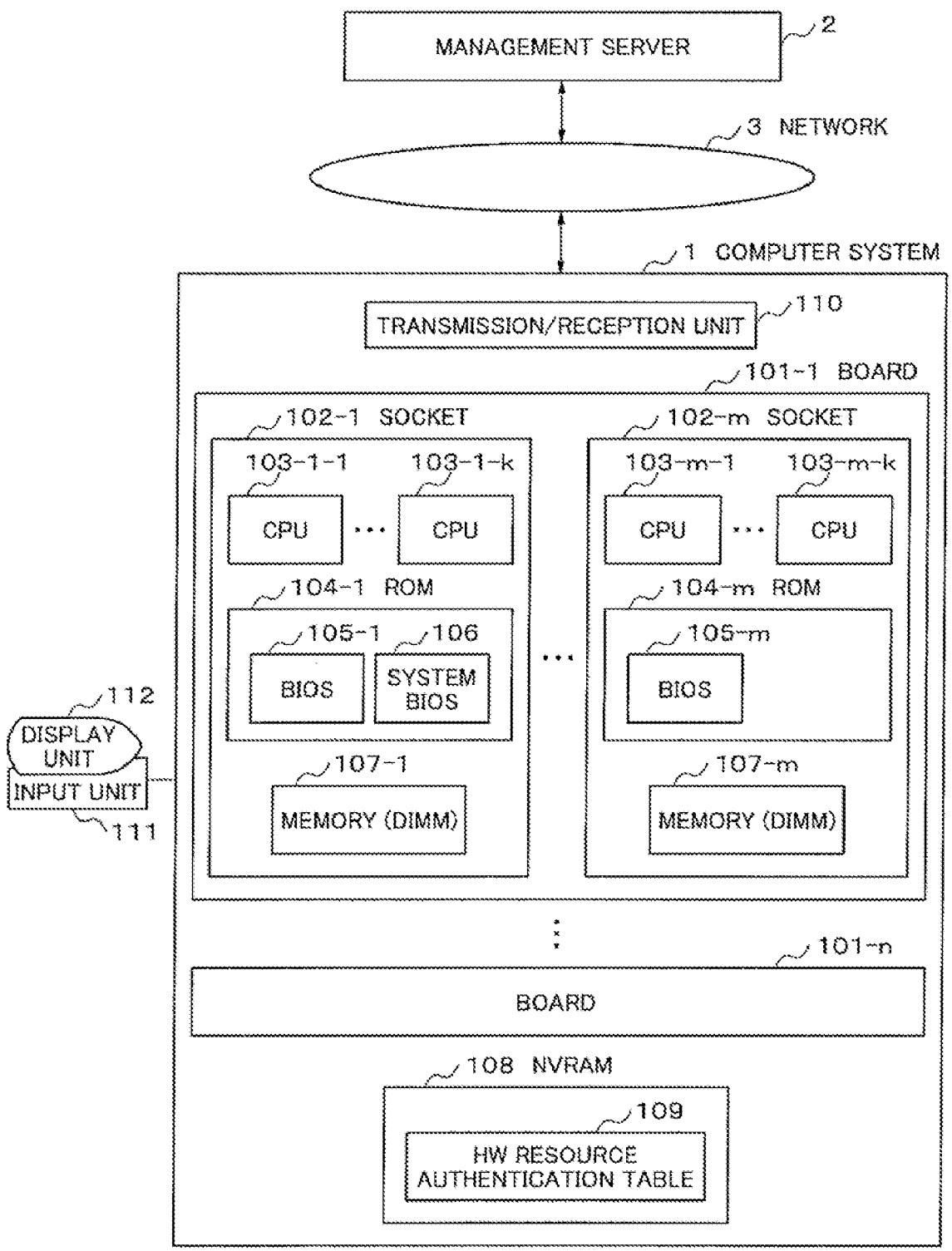
FIG. 1 is an exemplary block diagram showing an exemplary configuration of a system for managing hardware resources in an exemplary embodiment.

FIG. 1 is an exemplary block diagram showing an exemplary configuration of a system for managing hardware resources in an exemplary embodiment. Referring to FIG. 1, the system for managing hardware resources in the exemplary embodiment includes computer system 1 and management server 2. Computer system 1 and management server 2 are connected with each other via network 3 such as the Internet.

Computer system 1 includes a plurality of boards 101-1 to 101-n, NVRAM (Non Volatile RAM) 108, transmission/reception unit 110, input unit 111 such as a keyboard and display unit 112 such as an LCD.

Transmission/reception unit 110 transmits/receives data to/from management server 2 via network 3. HW resource authentication table 109 is registered in NVRAM 108. FIG. 16 is an exemplary diagram showing an example of HW resource authentication table 109. As shown in FIG. 16, an authentication key of the HW resource and an accounting flag to represent "has been accounted" or "has not been accounted" are registered in HW resource authentication table 109 for each of the HW resources (such as socket, CPU, and memory) provided in computer system 1. Additionally, a system authentication key generated by system authentication key generation unit 1062 mentioned hereinafter is registered in HW resource authentication table 109.

A plurality of sockets 102-1 to 102-m are mounted on one board (for example, board 101-1). The sockets 102-1 to 102-m are provided with a plurality of CPUs 103-1-1 to 103-1-k, 103-2-1 to 103-2-k, and 103-m-1 to 103-m-k, ROM 104-1 to 104-m, and memory 107-1 to 107-m, respectively. Further, when a HW resource is added to computer system 1, the addition is performed for each socket.

BIOSs (Basic input/output system) 105-1 to 105-m are stored in ROMs 104-1 to 104-m, respectively. BIOS 106 which is the only BIOS in system 1 that manages all the HW resources of computer system 1 is stored in ROM 104-1. Each of memories 107-1 to 107-m includes a plurality of DIMMs (Dual In-line Memory Module). Further, the other boards also have the same configuration as board 101-1. However, system BIOS 106 is stored in only ROM 104-1 on board 101-1.

Figure 2:
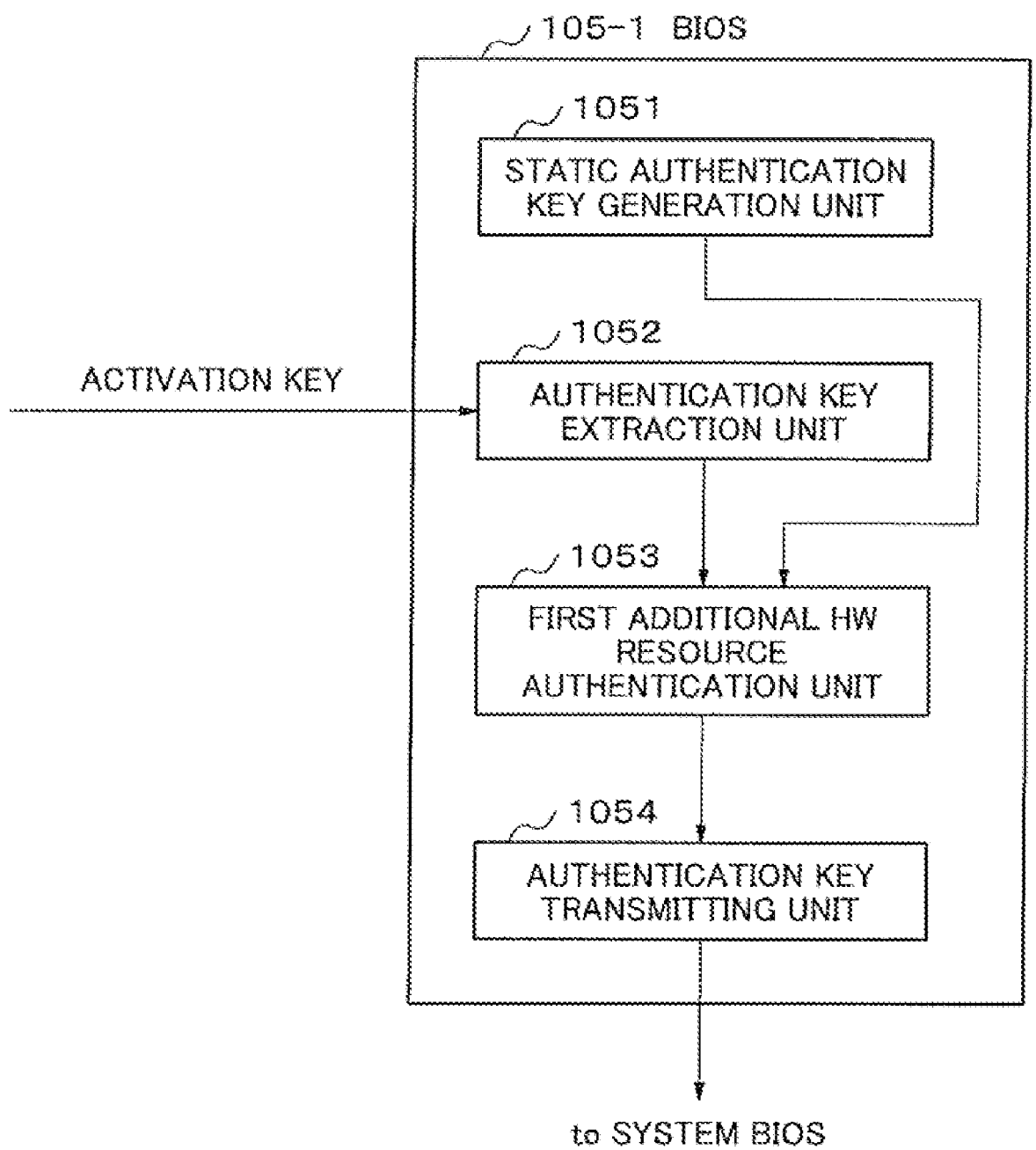
FIG. 2 is an exemplary block diagram showing an exemplary configuration of BIOS 105-1.

FIG. 2 is an exemplary block diagram showing an exemplary configuration of BIOS 105-1. Referring to FIG. 2, BIOS 105-1 includes static authentication key generation unit 1051, authentication key extraction unit 1052, first additional HW resource authentication unit 1053 and authentication key transmitting unit 1054. Further, the other BIOSs also include the same configuration as BIOS 105-1.

Static authentication key generation unit 1051 detects socket 102-1 on which static authentication key generation unit 1051 is mounted and HW resources (CPUs 103-1-1 to 103-1-k and memory 107-1) mounted on socket 102-1. Static authentication key generation unit 1051 generates an authentication key which is used for judging whether or not the HW resources can be installed in computer system 1 for each detected HW resource and includes attribute information on the HW resources.

Authentication key extraction unit 1052 extracts the authentication key from the activation key including the authentication key of the HW resource which is permitted to be installed in a computer system that is inputted by a user. Wherein, the activation key is sent from management server 2.

When socket 102-1 in which BIOS 105-1 is stored is added to computer system 1, first additional HW resource authentication unit 1053 judges whether or not socket 102-1 is the HW resource which is permitted to be installed in computer system 1 by comparing the authentication key generated by static authentication key generation unit 1051 with the authentication key extracted from the activation key by authentication key extraction unit 1052.

Authentication key transmitting unit 1054 transmits the authentication key generated by static authentication key generation unit 1051 and the authentication key extracted from the activation key by authentication key extraction unit 1052 to system BIOS 106.

Figure 3:
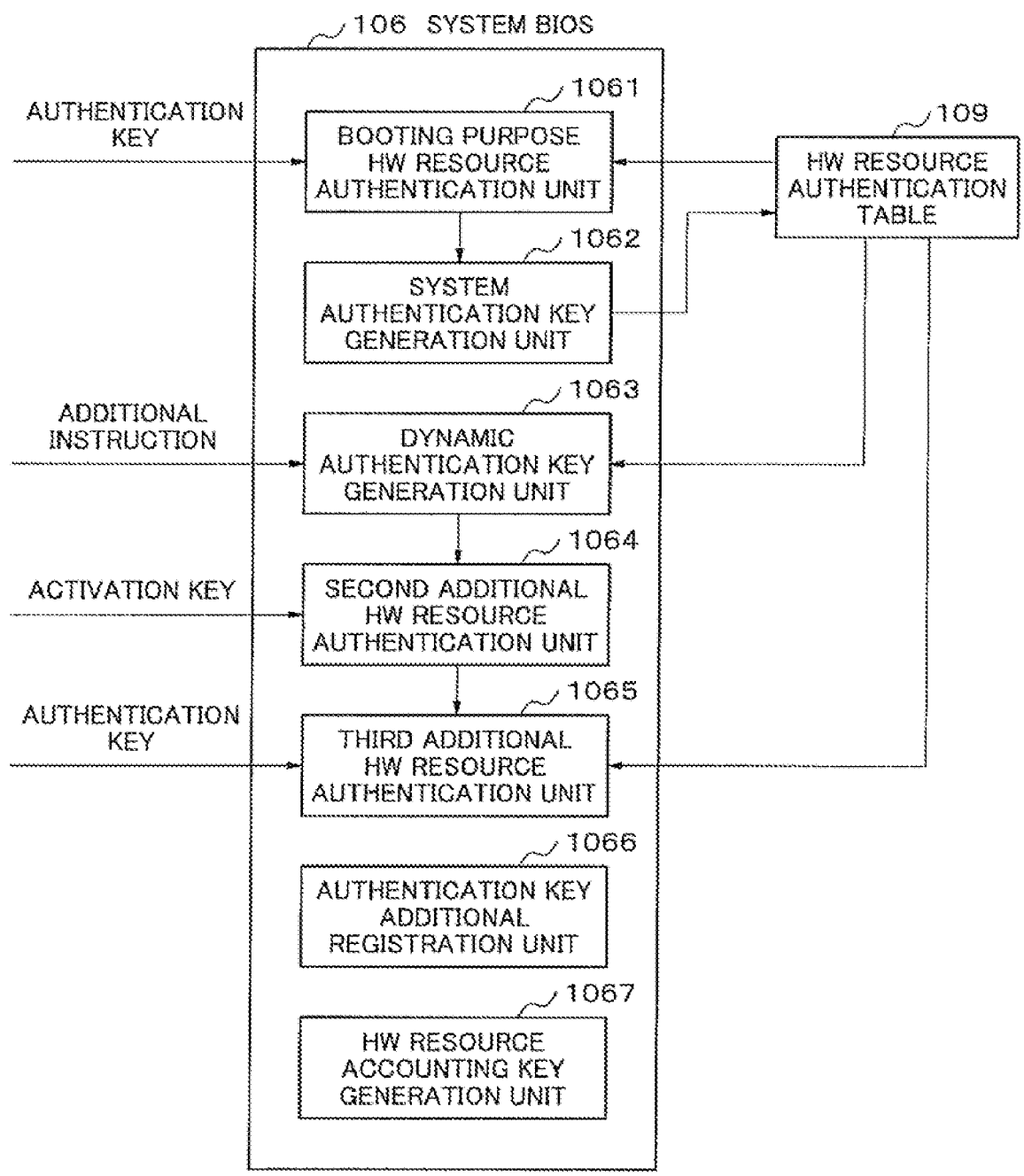
FIG. 3 is an exemplary block diagram showing an exemplary configuration of system BIOS 106.

FIG. 3 is an exemplary block diagram showing an exemplary configuration of system BIOS 106. Referring to FIG. 3, system BIOS 106 includes booting purpose HW resource authentication unit 1061, system authentication key generation unit 1062, dynamic authentication key generation unit 1063, second additional HW resource authentication unit 1064, third additional HW resource authentication unit 1065, authentication key additional registration unit 1066 and HW resource accounting key generation unit 1067.

Booting purpose HW resource authentication unit 1061 judges whether or not a HW resource detected by static authentication key generation unit 1051 can be installed in computer system 1 by using the authentication key generated by static authentication key generation unit 1051, and the authentication key and the accounting flag that are registered in HW resource authentication table 109 at the time of booting of computer system 1.

System authentication key generation unit 1062 generates a system authentication key which is a set of authentication keys of HW resources, which is judged to be able to be installed to computer system 1 by booting purpose HW resource authentication unit 1061, and registers the system authentication key in HW resource authentication table 109.

Dynamic authentication key generation unit 1063 extracts one authentication key related to the HW resource whose type is instructed by a user's adding instruction from the system authentication key. Dynamic authentication key generation unit 1063 generates dynamic installation authentication key including the above-mentioned extracted authentication key and a new arrangement need indicating flag indicating that arrangements of a HW resource are necessary and transmits the dynamic installation authentication key to management server 2 when the HW resource whose accounting flag registered in HW resource authentication table 109 is "has not been accounted" does not exist among the HW resources whose type are instructed. In contrast, when the HW resource whose accounting flag registered in HW resource authentication table 109 is "has not been accounted" exists, dynamic authentication key generation unit 1063 generates dynamic installation authentication key including the authentication key of the HW resource and the new arrangement need indicating flag indicating that arrangements of a HW resource are not necessary and transmits the dynamic installation authentication key to management server 2.

Second additional HW resource authentication unit 1064 judges whether or not the HW resource which is permitted to be installed in computer system 1 by management server 2 is the same type of HW resource as the HW resource that is requested to be arranged to management server 2 by comparing the authentication key in the activation key received from authentication key transmitting unit 1054 with dynamic installation authentication key generated by dynamic authentication key generation unit 1063.

Third additional HW resource authentication unit 1065 judges whether or not the added socket is a HW resource which can be installed in the computer system by comparing the above-mentioned authentication key of the socket that is received from authentication key transmitting unit 1054 on the added socket with the system authentication key.

Authentication key additional registration unit 1066 registers the authentication key of the HW resource newly installed in computer system 1 and the accounting flag indicating "has been accounted" in HW resource authentication table 109.

HW resource accounting key generation unit 1067 generates a HW resource accounting key including attribute information that is the same as that of the authentication key of the HW resource newly installed in computer system 1 and a unique serial number of computer system 1 and transmits the HW resource accounting key to management server 2.

Further, each of the above mentioned unit 1051 to 1054 and 1061 to 1067 can be realized by firmware or a program.

Figure 4:
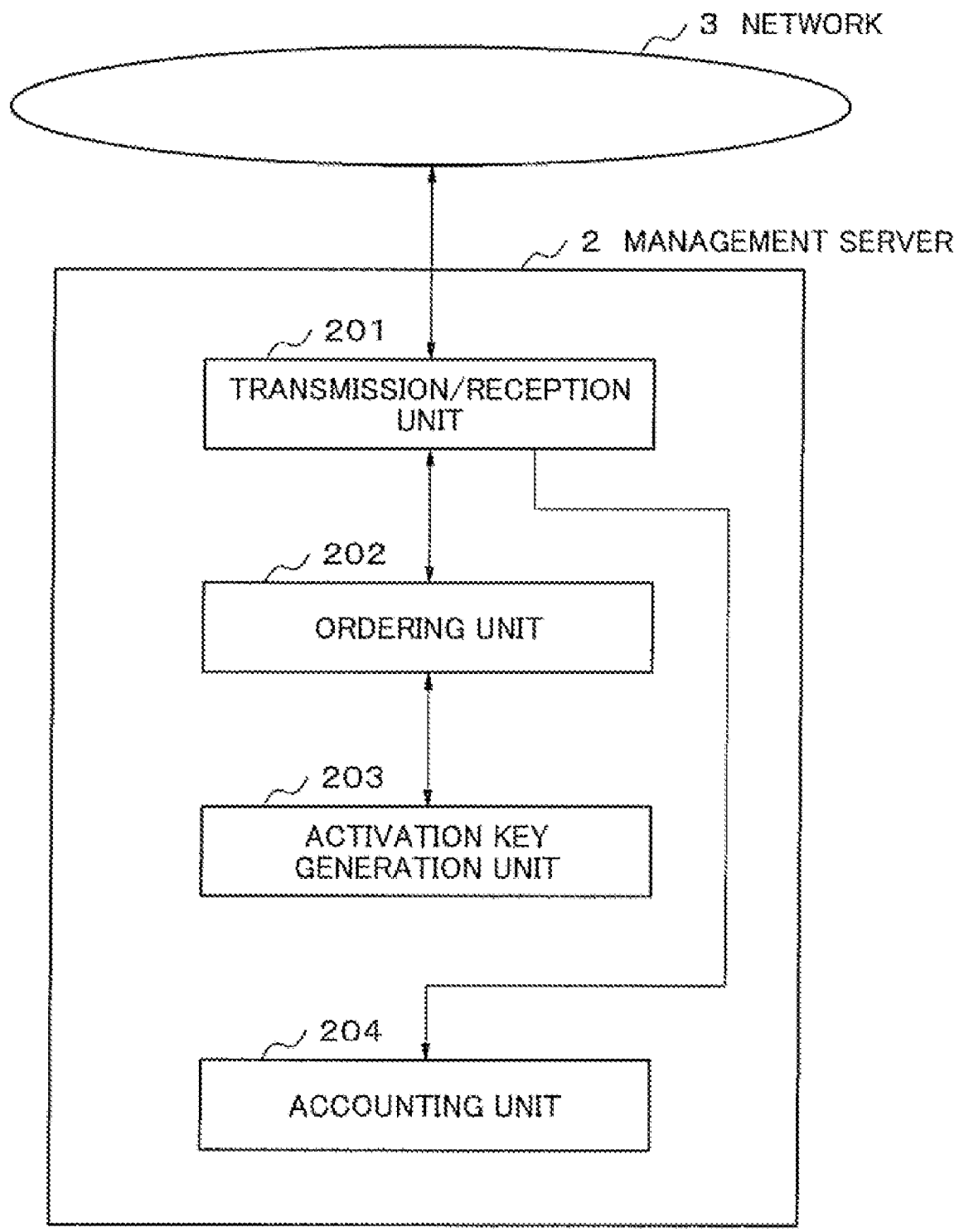
FIG. 4 is an exemplary block diagram showing an exemplary configuration of management server 2.

FIG. 4 is an exemplary block diagram showing an exemplary configuration of management server 2. Referring to FIG. 4, management server 2 includes transmission/reception unit 201, ordering unit 202, activation key generation unit 203 and accounting unit 204.

Transmission/reception unit 201 transmits/receives data to/from computer system 1 via network 3.

When the new arrangement need indicating flag in the dynamic installation authentication key that is received from computer system 1 indicates that arrangements of a HW resource are requested, ordering unit 202 performs a process to deliver the HW resource that is requested to be arranged from computer system 1 to a user of the computer system (for example, a process to transfer the above-mentioned dynamic installation authentication key to a section which takes charge of arranging the HW resource or the like).

Activation key generation unit 203 generates an activation key in which new arrangement need indicating flag in the dynamic installation authentication key received from computer system 1 is replaced with an installation recognition flag to indicate whether or not installation is permitted and transmits the activation key to computer system.

When accounting unit 204 receives the accounting key from computer system 1, accounting unit 204 starts accounting to the HW resource specified by this accounting key.

Further, each of unit 201 to 204 of management server 2 can be realized by firmware or a program.

Next, operation of the exemplary embodiment will be described in detail.

Figure 5:
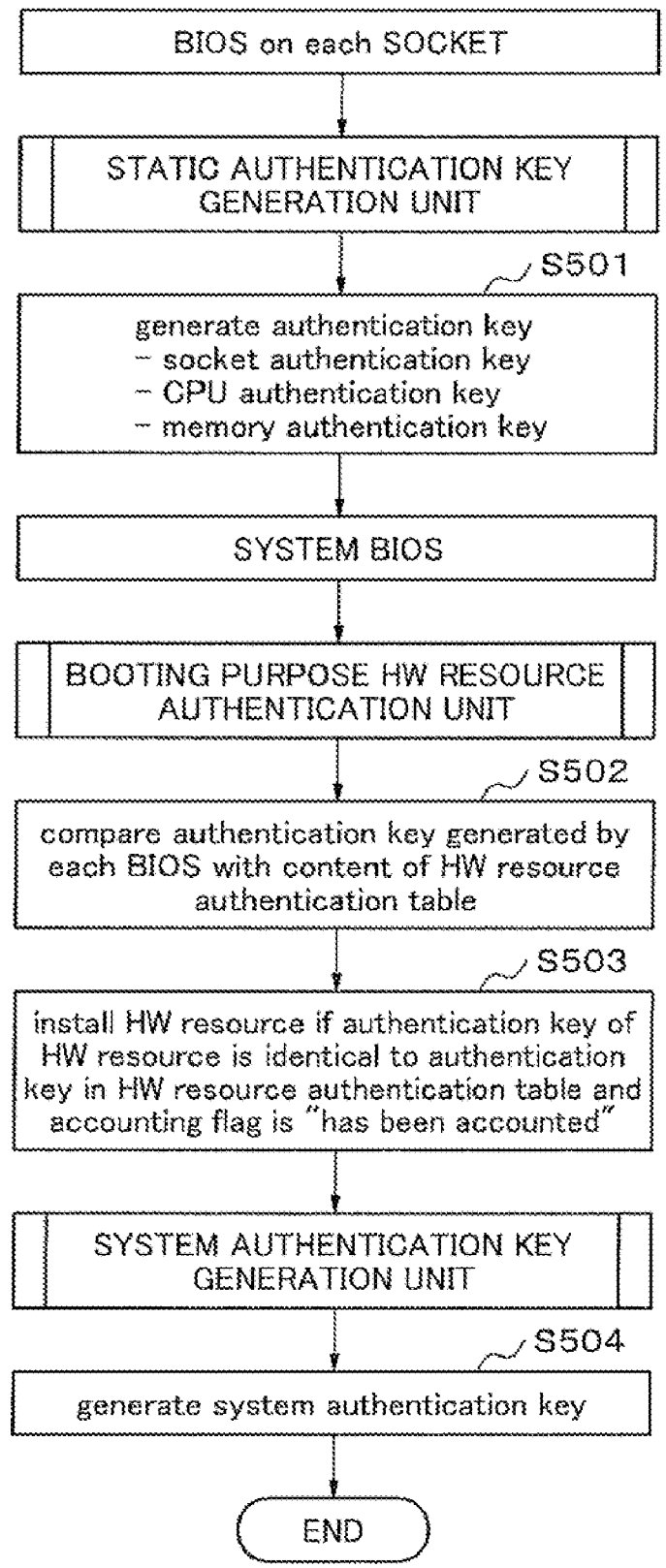
FIG. 5 is an exemplary flowchart showing an exemplary process when computer system 1 is booted up.

First, by referring to a flowchart shown in FIG. 5, operation when computer system 1 is booted up will be described. FIG. 5 is an exemplary flowchart showing an exemplary process when computer system 1 is booted up.

When computer system 1 is booted up, each of BIOSs 105-1 to 105-m on sockets 102-1 to 102-m detects the socket in which the BIOS is stored and the CPU and the memory mounted on the socket by using static authentication key generation unit 1051 in each BIOS and generates the authentication key used when the HW resource is installed in computer system 1 for each of the detected HW resources (Step S501).

Specifically, static authentication key generation unit 1051 generates three kinds of authentication keys that are a socket authentication key shown in FIG. 9, a CPU authentication key shown in FIG. 10 and a memory authentication key shown in FIG. 11.

FIG. 9 is an exemplary diagram showing an example of a socket authentication key. Referring to FIG. 9, the socket authentication key includes a socket authentication key's unique ID indicating the socket corresponding to the socket authentication key, revision of BIOS, a type of socket, revision of the socket that is called as stepping, a socket's unique ID, an operation frequency of the socket, a cache size held in the socket, a physical location number of the socket and a logical number assigned to the socket. In the exemplary embodiment, the socket authentication key is encrypted by a secret key or the like.

FIG. 10 is an exemplary diagram showing an example of the CPU authentication key. Referring to FIG. 10, the CPU authentication key includes the socket authentication key's unique ID of the socket on which the CPU is mounted, a CPU authentication key's unique ID indicating that it is the CPU authentication key, a CPU core number in the socket on which the CPU is mounted and a CPU thread number in a CPU core in which the CPU is mounted. In the exemplary embodiment, the CPU authentication key is encrypted by the secret key or the like.

FIG. 11 is an exemplary diagram showing an example of a memory authentication key. Referring to FIG. 11, the memory authentication key includes the socket authentication key's unique ID of the socket on which the memory is mounted, a memory authentication key's unique ID indicating that it is the memory authentication key, and a type, speed, manufacturer/vendor name and a serial number of DIMM with which the memory is configured. In the exemplary embodiment, the memory authentication key is encrypted by the secret key or the like.

Here, the socket authentication key and the memory authentication key are generated by one BIOS which operates on the representative CPU in the socket. The CPU authentication key is generated by the BIOS which operates in the CPU core in the socket and the CPU thread in the CPU core.

After that, booting purpose HW resource authentication unit 1061 in system BIOS 106 compares the authentication key generated by each of BIOSs 105-1 to 105-m with HW resource authentication table 109 in step S501. Booting purpose HW resource authentication unit 1061 installs the HW resource in computer system 1 if the authentication key of the HW resource generated by BIOS 105 is identical to the authentication key of the HW resource in HW resource authentication table 109 and the accounting flag of the HW resource in HW resource authentication table 109 is "has been accounted" (Steps S502 and S503). Further, in the exemplary embodiment, it is assumed that at least one socket whose accounting flag is "has been accounted" exists for each type of socket.

After that, system authentication key generation unit 1062 in system BIOS 106 generates the system authentication key which is a set of authentication keys of HW resources installed in computer system 1 and registers the system authentication key in HW resource authentication table 109 (Step S504).

FIG. 12 is an exemplary diagram showing an example of a system authentication key. Referring to FIG. 12, the system authentication key includes a system authentication key's unique ID indicating that it is the system authentication key, an unique serial number of computer system 1, authentication keys of the socket, the CPU and the memory installed in computer system 1, a bitmap of the physical location number and a bitmap of the logical number of the socket installed in computer system 1. Further, in the exemplary embodiment, the system authentication key is encrypted by a secret key or the like.

Figure 6:
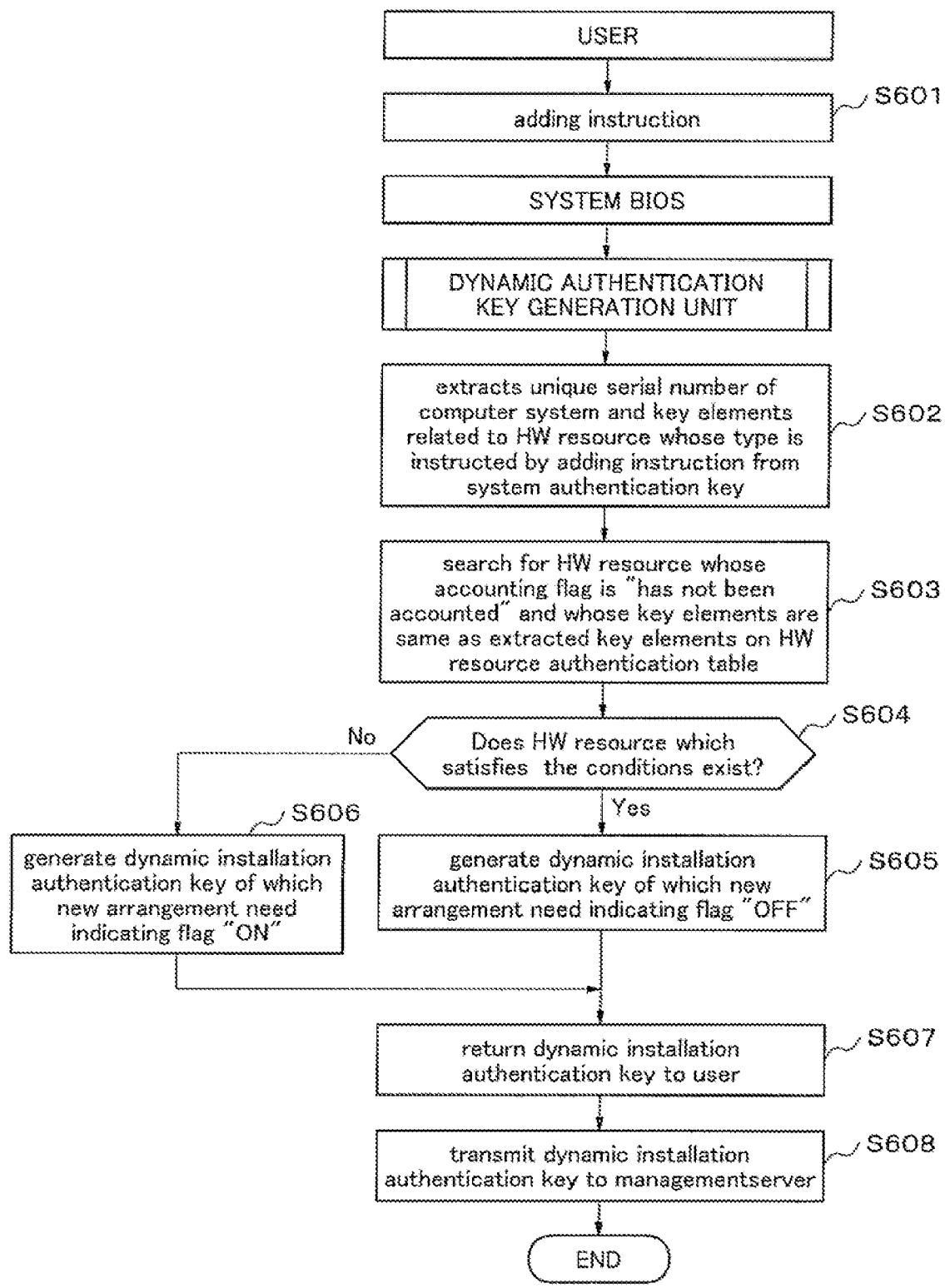
FIG. 6 is an exemplary flowchart showing an exemplary process when an instruction for adding HW resources to computer system 1 is inputted.

Next, by referring to a flowchart shown in FIG. 6, in a state in which computer system 1 is operated, operation in the case where a user instructs system BIOS 106 to add a HW resource will be described. FIG. 6 is an exemplary flowchart showing an exemplary process when an instruction for adding a HW resource to computer system 1 is inputted. Further, in the following description, the case in which a socket whose type is "k1" is added is taken as an example.

First, a user inputs the instruction for adding a HW resource including information about a type of the HW resource to be added to system BIOS 106 from a console provided by firmware on a service processor (not shown) (Step S601). In the case of this example, the user inputs the instruction for adding the HW resource including information about the socket type of "k1" to system BIOS 106.

Dynamic authentication key generation unit 1063 in system BIOS 106 decrypts the system authentication key registered in HW resource authentication table 109, extracts the unique serial number of computer system 1 and key elements related to the HW resource whose type is instructed by the adding instruction from the decrypted system authentication key (Step 3602). In this example, because the type of the socket instructed by the adding instruction is "k1", the attribute information (BIOS Revision, a type of socket, stepping, socket's unique ID, operation frequency of the socket and a cache size held in the socket) on the socket whose type is "k1", a bitmap indicating the physical location number of the socket which has already been installed in computer system 1 and a bitmap indicating the logical number that is assigned to the socket which has already been installed in computer system 1 are extracted from the system authentication key.

Next, dynamic authentication key generation unit 1063 search for a socket whose accounting flag is "has not been accounted" and whose key elements (BIOS Revision, type of socket, stepping, operation frequency of the socket and the cache size held in the socket) in the authentication key are the same as the key elements (BIOS Revision, type of socket, stepping, operation frequency of the socket and the cache size held in the socket) that are extracted from the system authentication key in Step S602 on HW resource authentication table 109 (Steps S603 and S604).

When the socket which satisfies the above-mentioned conditions exists ("Yes" judgment in step S604), dynamic authentication key generation unit 1063 generates the socket dynamic installation authentication key for dynamically installing the socket in computer system 1 (step S605). Specifically, dynamic authentication key generation unit 1063 generates the socket dynamic installation authentication key including a unique ID indicating that it is a socket dynamic installation authentication key, the unique serial number of computer system 1, the authentication key of the socket (BIOS Revision, type of socket, stepping, operation frequency of the socket, the cache size held in the socket, the physical location number of the socket and the logical number assigned to the socket) and a new arrangement need indicating flag "OFF (0)" which indicates that arrangements of the socket are unnecessary and encrypts the generated socket dynamic installation authentication key (refer to FIG. 13). Moreover, dynamic authentication key generation unit 1063 displays information (for example, attribute information) which specifies the socket and a message indicating that the socket can be installed in computer system 1 by inputting the activation key reported by management server 2 in computer system 1 to display unit 112 in step S605.

In contrast, when a socket which satisfies the above-mentioned conditions does not exist ("No" judgment in step S604), dynamic authentication key generation unit 1063 generates the socket dynamic installation authentication key for requesting arrangements of the socket on the basis of the information extracted from the system authentication key in step S602 (Step S606). Specifically, dynamic authentication key generation unit 1063 generates the socket dynamic installation authentication key including the unique ID indicating that it is the socket dynamic installation authentication key, the unique serial number of computer system 1, the BIOS Revision, the type of the socket, stepping, operation frequency of the socket, the cache size held in the socket, the physical location number of the socket to be added, the logical number assigned to the socket to be added and the new arrangement need indicating flag "ON (1)" which indicates that arrangements of the socket are necessary and encrypts the generated socket dynamic installation authentication key (refer to FIG. 13). Here, dynamic authentication key generation unit 1063 sets the physical location number indicating a location for adding the socket at which optimal system performance can be obtained to the physical location number of the socket. For example, when computer system 1 includes a plurality of buses, dynamic authentication key generation unit 1063 determines the location at which the socket is added so that approximately the same number of the sockets are mounted on each bus on the basis of the bitmap of the physical location number of the socket extracted from the system authentication key in step S602 and sets the physical location number indicating this location. Dynamic authentication key generation unit 1063 obtains, for example, the smallest logical number among the logical numbers that are not assigned on the basis of the bitmap of the logic number of the socket extracted from the system authentication key in step S602 and uses this logical number as the logical number assigned to the socket to be added. Moreover, dynamic authentication key generation unit 1063 displays the physical location number for the socket to be added and a message indicating that the socket sent from a vendor can be installed in computer system 1 by mounting the socket on the location indicated by the physical location number and inputting the activation key sent from the vendor to computer system 1 to display unit 112 in step S606.

When the process in step S605 or step S606 ends, dynamic authentication key generation unit 1063 returns the generated socket dynamic installation authentication key to the user (step S607). The user transmits the socket dynamic installation authentication key to management server 2 of the vendor providing computer system 1 (Step S608).

Figure 7:
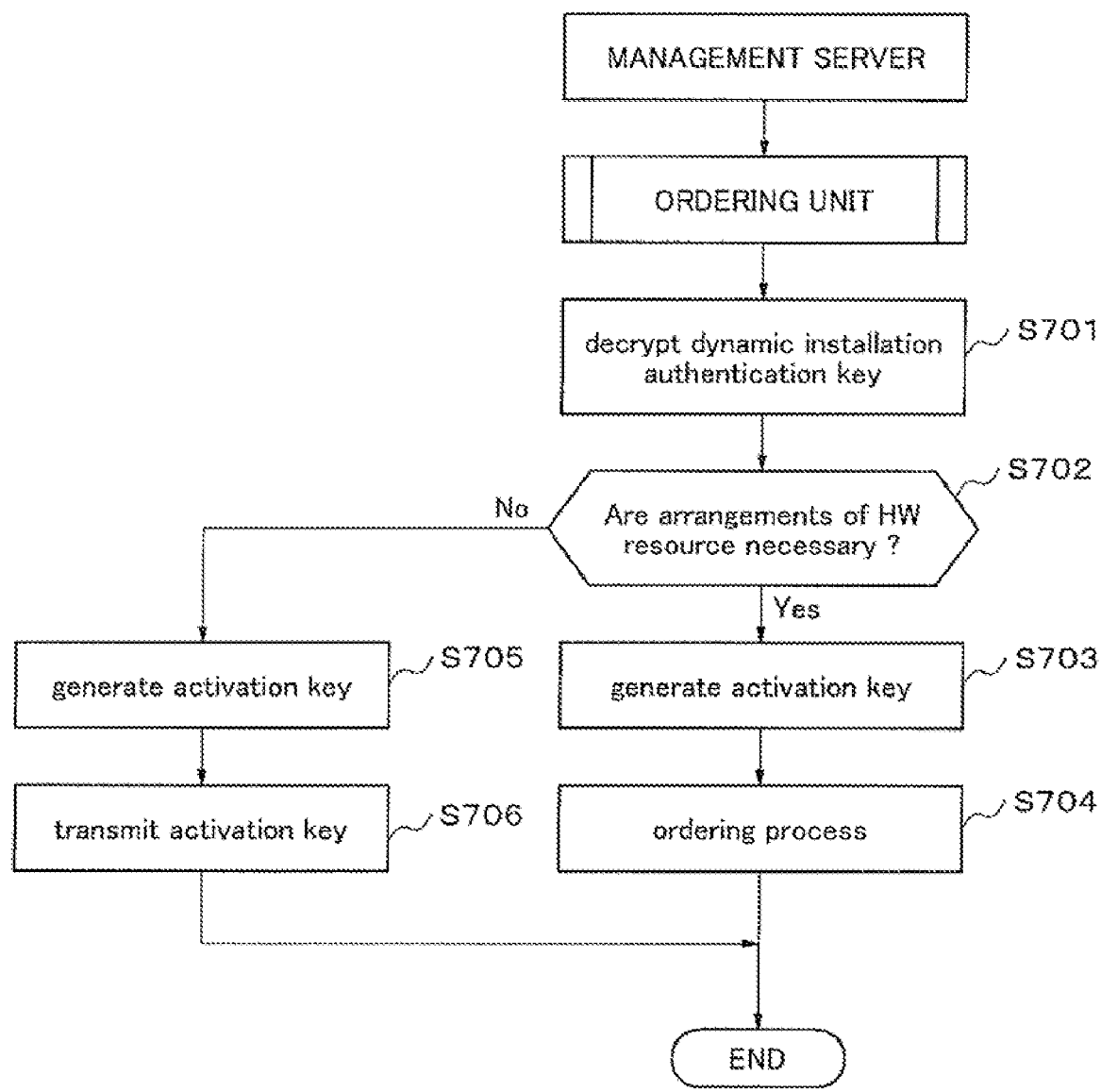
FIG. 7 is an exemplary flowchart showing an exemplary process of management server 2.

Next, by referring to a flowchart shown in FIG. 7, operation in the case where management server 2 receives the dynamic installation authentication key from computer system 1 will be described. FIG. 7 is an exemplary flowchart showing an exemplary process of management server 2.

When ordering unit 202 in management server 2 receives the dynamic installation authentication key from computer system 1 via transmission/reception unit 201, ordering unit 202 decrypts the dynamic installation authentication key by using a public key (step S701). After that, ordering unit 202 judges whether or not the arrangements of the HW resource are necessary based on the new arrangement need indicating flag in the decrypted dynamic installation authentication key (step S702). Specifically, ordering unit 202 judges that the arrangements are not necessary when the new arrangement need indicating flag is "OFF (0)" and the arrangements are necessary when the new arrangement need indicating flag is "ON (1)".

When ordering unit 202 judges that the arrangements are necessary ("Yes" judgment in step S702), ordering unit 202 sends the received dynamic installation authentication key to activation key generation unit 203 and requests generation of the activation key (step S703). Activation key generation unit 203 which receives the request generates the activation key by replacing the new arrangement needs indicating flag in the dynamic installation authentication key with the installation recognition flag, and returns the activation key to ordering unit 202. For example, when the socket dynamic installation authentication key shown in FIG. 13 is received, the activation key shown in FIG. 14 is generated. Here, the installation recognition flag "ON (1)" indicates that installation of the HW resource is permitted. After that, ordering unit 202 performs an ordering process, for example, transmission of the dynamic installation authentication key and the activation key to a section which takes charge of arranging the HW resource or the like (Step S704). The section which takes charge of arranging the HW resource recognizes the HW resource to be arranged from the received dynamic installation authentication key and sends the recognized HW resource to the user of computer system 1. At that time, the section also sends a CDROM in which the activation key is recorded.

In contrast, when it is judged that arrangements of the HW resource are not necessary ("No" judgment in step S702), ordering unit 202 requests activation key generation unit 203 to generate the activation key (Step S705) and transmits the activation key returned from activation key generation unit 203 in response to the request to the user of computer system 1 (Step S706).

Figure 8:
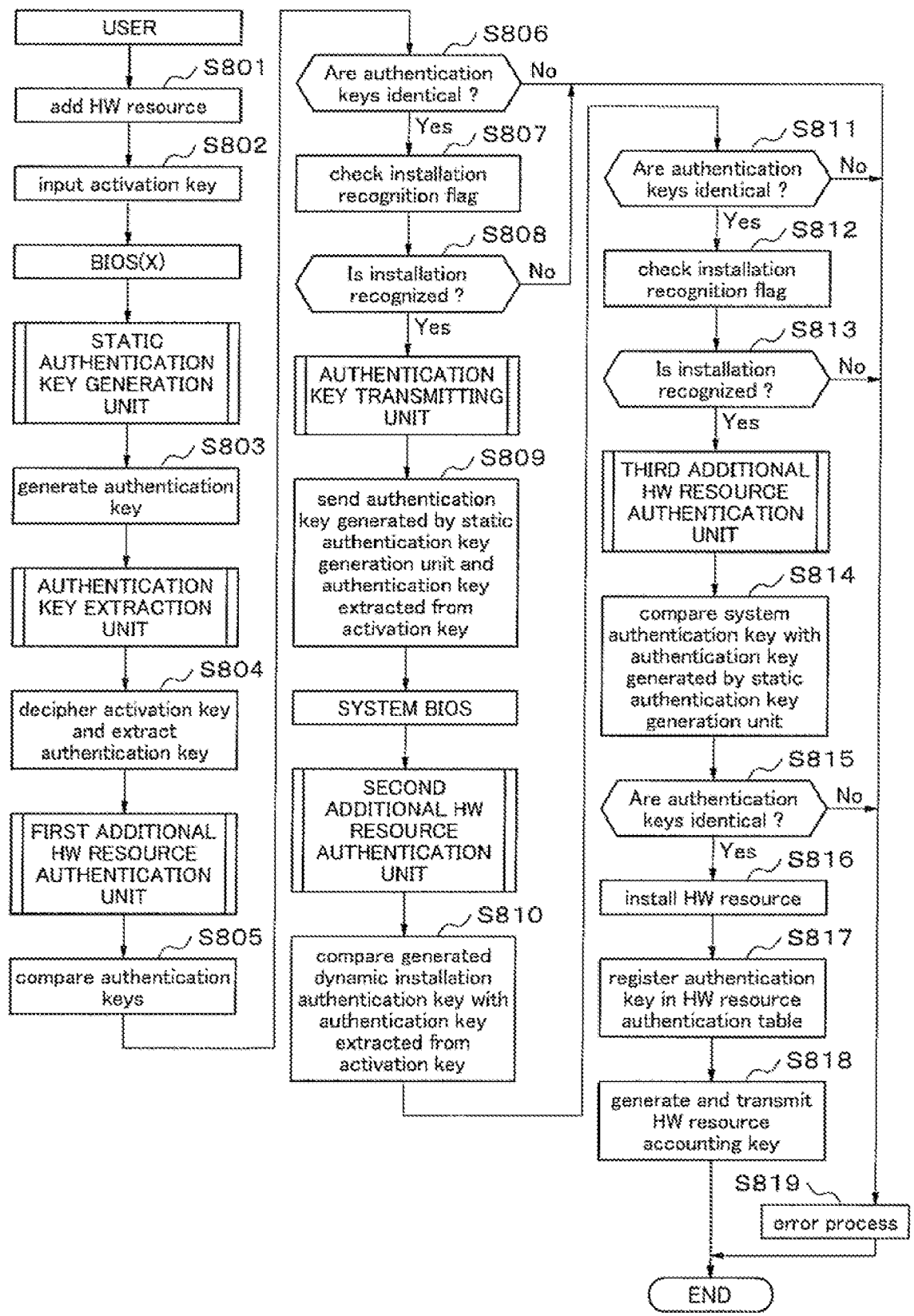
FIG. 8 is an exemplary flowchart showing an exemplary process when a HW resource is added to computer system 1.

Next, by referring to a flowchart shown in FIG. 8, operation ill the case where the user of computer system 1 adds a HW resource will be described. FIG. 8 is an exemplary flowchart showing an exemplary process in which a HW resource is added in computer system 1. In the following description, operation in the case in which a socket (X) sent from a vendor managing management server 2 is added is explained as an example. Further, the socket (X) has the same configuration as the other sockets 102-1 to 102-*m*.

First, the user adds the socket (X) sent from the vendor without stopping computer system 1 (Step S801). Further, a mounting location of the socket is the location indicated in display unit 112 in step S606 mentioned above. After that, the user inputs a command that instructs the BIOS (X) on the socket (X) to perform booting from a console provided by firmware on a service processor (not shown). At that time, the user also inputs the activation key sent from the vendor as a parameter associated with the command (Step S802). At that time, the firmware sends the activation key to the BIOS (X) by setting the activation key to the register on the CPU mounted on the socket (X) and at the same time, asserts the reset signal to the CPU on the socket (X).

The BIOS (X) has the same configuration as the other BIOSs. Static authentication key generation unit 1051 of the BIOS (X) generates the authentication key related to the socket (X), and the CPU and the memory mounted on the socket (Step 5803). Specifically, static authentication key generation unit 1051 generates three kinds of authentication keys that are the socket authentication key shown in FIG. 9, the CPU authentication key shown in FIG. 10 and the memory authentication key shown in FIG. 11.

After that, authentication key extraction unit 1052 of the BIOS (X) deciphers the activation key (for example, decoding using a secret key) and extracts the authentication key (attribute information) of the HW resource which is permitted to be installed in computer system 1 and the installation recognition flag (Step S804).

Moreover, first additional HW resource authentication unit 1053 of the BIOS (X) compares the authentication key generated in step S803 with the authentication key extracted from the activation key in step S804 (Step S805). Because this example shows the case in which the socket is installed, the socket authentication key from three kinds of authentication keys generated in step S803 is compared with the authentication key extracted from the activation key. Specifically, first additional HW resource authentication unit 1053 compares revision of the BIOS, the type of the socket, stepping of the socket, operation frequency of the socket, the cache size held in the socket, the physical location number of the socket and the logical number assigned to the socket that are included in the socket authentication key generated in step S803 with those included in the socket authentication key extracted from the activation key.

When the authentication key generated in step S803 is identical to the authentication key extracted from the activation key in step 3804 ("Yes" judgment in step S806), first additional HW resource authentication unit 1053 further checks the installation recognition flag and judges whether or not installation of the HW resource is recognized (permitted) (Step S807).

When the authentication keys are not identical ("No" judgment in step S806) or the installation is not recognized ("No" judgment in step S808), first additional HW resource authentication unit 1053 performs an error process in which an error is displayed in display unit 112 and the like (Step S819) and then ends the process.

In contrast, when the authentication keys are identical and the installation is recognized ("Yes" judgment in steps S806 and S808), authentication key transmitting unit 1054 of the BIOS (X) sends three kinds of authentication keys generated in step S803 and the authentication key extracted from the activation key in step S804 to system BIOS 106 (Step S809) because it is certified that the socket (X) is not the unauthorized HW resource.

Second additional HW resource authentication unit 1064 of system BIOS 106 compares the dynamic installation authentication key generated by dynamic authentication key generation unit 1063 with the authentication key extracted from the activation key received from the BIOS (X) (Step 3810). Specifically, second additional HW resource authentication unit 1064 compares the unique serial number of computer system 1 and the attribute information that are included in the dynamic installation authentication key generated by dynamic authentication key generation unit 1063 with those included in the authentication key extracted from the activation key received from the BIOS (X). The comparison of the attribute information is performed with respect to revision of the BIOS, the type of the socket, stepping of the socket, operation frequency of the socket, the cache size held in the socket, the physical location number of the socket and the logical number assigned to the socket.

When the dynamic installation authentication key is identical to the authentication key extracted from the activation key ("Yes" judgment in step S811), second additional HW resource authentication unit 1064 further judges whether or not the installation to computer system 1 is recognized based on the installation recognition flag extracted from the activation key (Steps S812 and S813).

When the authentication keys are not identical ("No" judgment in step S811) or the installation is not recognized ("No" judgment in step S813), second additional HW resource authentication unit 1064 performs the error process (Step 5819) and then ends the process.

In contrast, when the authentication keys are identical and the installation is recognized, it is certified that the socket (X) is not the HW resource which does not fit computer system 1.

Namely, dynamic installation authentication key is generated on the basis of the system authentication key which is a set of the authentication keys of the HW resources which have already been installed in computer system 1. Therefore, when the activation key is identical to the dynamic installation authentication key, it means that the same type of socket as the socket (X) sent from the vendor has already been installed in computer system 1 as an authorized HW resource. Accordingly, the socket (X) is not a socket which does not fit computer system 1.

Third additional HW resource authentication unit 1065 of system BIOS 106 compares the system authentication key generated by system authentication key generation unit 1062 in step S504 with the authentication key received from the BIOS (X) (the authentication key generated by static authentication key generation unit 1051) (Step S814). Because this example shows the case in which the socket is installed, third additional HW resource authentication unit 1065 compares the socket authentication key which is one of three kinds of authentication keys generated by static authentication key generation unit 1051, with the system authentication key. More specifically, third additional HW resource authentication unit 1065 judges that the socket authentication key generated by static authentication key is identical to the system authentication key when revision of the BIOS, the type of the socket, stepping of the socket, operation frequency of the socket, and the cache size held in the socket of the socket authentication key are identical to those of the system authentication key, respectively and judges that both keys are not identical when those of the socket authentication key are not identical to those of the system authentication key.

When the both keys are not identical ("No" judgment in step S815), third additional HW resource authentication unit 1065 performs the error process (Step S819) and then ends the process.

In contrast, when the both keys are identical ("Yes" judgment in step S815), third additional HW resource authentication unit 1065 judges that the socket (X) is not a HW resource that does not fit a computer system and installs the socket (X). Namely, when the system authentication key is identical to the authentication key generated by the BIOS (X), the same type of socket as the socket (X) has already been installed in computer system 1 as an authorized HW resource. Accordingly, the socket (X) is not a HW resource that does not fit the computer system. Further, when the socket (X) is installed, third additional HW resource authentication unit 1065 also installs the CPU and the memory mounted on the socket (X) in computer system 1 (Step S816).

After that, authentication key additional registration unit 1066 of system BIOS 106 registers the authentication key of the added socket (X), CPU and memory to HW resource authentication table 109 shown in FIG. 16 and also sets the accounting flag corresponding to each of the authentication keys to "ON (1)" which indicates "has been accounted" (Step S817).

Moreover, HW resource accounting key generation unit 1067 of system BIOS 106 generates the accounting key and transmits the generated accounting key to management server 2 (Step S818). More specifically, HW resource accounting key generation unit 1067 generates the accounting key of the socket (X), each CPU mounted on the socket (X) and each memory mounted on the socket (X) and transmits these generated accounting keys to management server 2. For example, as shown in FIG. 15, the accounting key (socket accounting key) of the socket (X) includes a socket accounting key's unique ID indicating that it is the socket accounting key, the unique serial number of computer system 1, attribute information on the socket (X), and an accounting start flag "ON (1)" indicating that accounting is started. Here, the attribute information on the socket (X) includes revision of the BIOS, the type of the socket, stepping of the socket, the socket's unique ID, operation frequency of the socket, the cache size held in the socket, the physical location number of the newly added socket and the logical number assigned to the socket. Further, in the exemplary embodiment, the accounting key is encrypted by a secret key or the like and transmitted to management server 2.

When accounting unit 204 of management server 2 receives the accounting key sent from computer system 1 via transmission/reception unit 201, accounting unit 204 starts the accounting to the HW resource specified by the accounting key.

Next, operation in the case where the HW resource which has already been mounted in computer system 1 and to which the accounting has not been started is installed in computer system 1 will be described. Here, the case in which a socket (Y) which has already been mounted in computer system 1 and to which the accounting has not been started is installed in computer system 1 will be described as an example. Further, operation in the case where the socket (Y) is installed in computer system 1 is almost the same as the operation in the case where the socket (X) is installed in computer system 1 described by using a flowchart shown in FIG. 8. Therefore, only difference therebetween will be described herein.

Because the socket (Y) has already been mounted on computer system 1, a process to add the HW resource to computer system 1 (process in step S801) is not necessary. In step S802, the user inputs a command that instructs the BIOS (Y) on the socket (Y) to perform booting from a console provided by firmware on a service processor (not shown). At that time, the user also inputs the activation key received from management server 2. Because the process from step S803 to step S809 is a process for the socket (Y), the process is performed by the BIOS (Y) on the socket (Y) and not performed by the BIOS (X) on the socket (X). Because the authentication key of the socket (Y), the CPU on the socket (Y) and the memory on the socket (Y) has already been registered in HW resource authentication table 109, in step S817, authentication key additional registration unit 1066 does not perform a registration process of the authentication key. Because the accounting flag corresponding to each of the authentication keys indicates "has not been accounted", authentication key additional registration unit 1066 changes each of the accounting flags to "ON (1)" which indicates "has been accounted". The other operations excluding this are the same as the operations in which the socket (X) is installed in computer system 1.

Further, in a description mentioned above, in step S810 shown in FIG. 8, second additional HW resource authentication unit 1064 judges whether or not the added socket (X) is the HW resource which does not fit computer system 1 by comparing the dynamic installation authentication key with the authentication key extracted from the activation key. However, second additional HW resource authentication unit 1064 may judge whether or not the socket (X) is the HW resource which does not fit computer system 1 by comparing the dynamic installation authentication key with the socket authentication key generated by the BIOS (X) on the added socket (X). In the description mentioned above, in step S814 shown in FIG. 8, third additional HW resource authentication unit 1065 compares the system authentication key with the authentication key generated by the BIOS (X). However, third additional HW resource authentication unit 1065 may omit this process and perform a process to install the HW resource (step S816) immediately when the judgment result in step S813 is "Yes".

By using the exemplary embodiment, in a computer system, not only the installation of the unauthorized HW resource but also the installation of the HW resource which does not fit the computer system can be avoided by utilizing the activation key. That is because, first additional HW resource authentication unit 1053 judges whether or not an installation target HW resource is the unauthorized HW resource by comparing the activation key sent from management server 2 with the authentication key of the installation target HW resource generated by static authentication key generation unit 1051, and then second additional HW resource authentication unit 1064 judges whether or not the installation target HW resource is the HW resource which does not fit computer system 1 by comparing the activation key with the dynamic installation authentication key generated by dynamic authentication key generation unit 1063. In other words, the dynamic installation authentication key is generated on the basis of the system authentication key which is a set of the authentication keys of the HW resources which have already been installed in computer system 1. Therefore, when the activation key is identical to the dynamic installation authentication key, it means that the same type of HW resource as an additional HW resource sent from the vendor has already been installed in computer system 1 as an authorized HW resource. Accordingly, the additional HW resource is not the HW resource which does not fit computer system 1.

By using the exemplary embodiment, because third additional HW resource authentication unit 1065 compares the system authentication key with the authentication key generated by static authentication key generation unit 1051 on the additional HW resource, third additional HW resource authentication unit 1065 and second additional HW resource authentication unit 1064 check whether or not the additional HW resource is the HW resource which does not fit computer system 1. Accordingly, a risk of installing the HW resource which does not fit computer system 1 is installed becomes very small.

By using the exemplary embodiment, when the type of the HW resource to be added is instructed by an adding instruction, because dynamic authentication key generation unit 1063 requests arrangements of the HW resource and transmission of the activation key to management server 2 by extracting the authentication key of the HW resource whose type is instructed from the system authentication key, generating the dynamic installation authentication key including attribute information that is included in the extracted authentication key, and transmitting the dynamic installation authentication key to management server 2, the user of computer system 1 can order the HW resource by specifying only the type of the HW resource.

By using the exemplary embodiment, when the HW resource is added in computer system 1, because HW resource accounting key generation unit 1067 transmits the accounting key to management server 2 and then accounting unit 204 in management server 2 starts accounting to the HW resource, management server 2 can start accounting to the HW resource immediately after the installation of the new HW resource.

When the HW resource is installed in the computer system, it is important to avoid installation of the HW resource which is not permitted by an owner, an administrator or the like. For example, when a computer system is operated in a mode in which accounting is performed according to the quantity of the installed HW resources, the charged amount becomes smaller than a reasonable amount if the HW resource (unauthorized HW resource) which is not permitted by an owner is installed. Therefore, it is important to avoid installation of the unauthorized HW resource. In order to avoid the installation of the unauthorized HW resource, the following method can be used for example. That is, when the HW resource to be newly added is provided to the user of the computer system, the activation key (for example, attribute information on the HW resource is included therein) for permitting use of the HW resource is also provided. At the time of installation of the HW resource, the attribute information included in the activation key provided by the owner is compared with the attribute information on the HW resource. When the attribute information included in the activation key is identical to the attribute information on the HW resource, the installation of the HW resource is permitted.

By using the method mentioned above, the installation of the unauthorized HW resource can be avoided. However, in the method mentioned above, the following problem still remains. That is, when the new HW resource is installed in the computer system, malfunction of the HW resource may occur and it may have a bad influence on the computer system depending on a combination of the computer system and the HW resource. However, in the method mentioned above, because only the comparison of the attribute information included in the activation key and the attribute information on the installation target HW resource is performed, the installation of the HW resource that has a bad influence on the computer system (the HW resource which does not fit the computer system) can not be avoided.

An exemplary advantage according to the invention is to be able to provide a system for managing HW resources with which not only the installation of the unauthorized HW resource but also the installation of the HW resource which does not fit the computer system can be avoided by using the activation key.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:
1. A system for managing hardware resources, comprising:
a computer system including hardware; and
a management server computing device;
wherein said computer system includes:
a first authentication key generation unit implemented at least by the hardware and that detects hardware resources mounted on said computer system and generates authentication keys including attribute information on the detected hardware resources, respectively, each of the authentication keys being for judging whether or not each of the hardware resources is able to be installed in said computer system;
a second authentication key generation unit implemented at least by the hardware and that requests said management server to arrange for the hardware resource and transmit an activation key by extracting the authentication key related to the hardware resource having a type instructed by an adding instruction from a system authentication key that is a set of the authentication keys of the hardware resources installed in said computer system, generating an installation authentication key including the attribute information included in the extracted authentication key and transmitting the installation authentication key to said management server;

a first additional hardware resource authentication unit implemented at least by the hardware and that judges whether or not a new hardware resource is an unauthorized hardware resource which is not permitted to be installed by comparing the authentication key of said new hardware resource generated by said first authentication key generation unit with the activation key sent from said management server at the time of addition of said new hardware resource; and a second additional hardware resource authentication unit implemented at least by the hardware and that judges whether or not said new hardware resource is an unfitted hardware resource which potentially has a negative effect on said computer system by comparing the installation authentication key generated by said second authentication key generation unit with the activation key sent from said management server at the time of addition of said new hardware resource, and wherein said management server includes:

an activation key generation unit that transmits the activation key including the attribute information included in the installation authentication key sent from said computer system, to said computer system.

2. The system for managing hardware resources according to claim 1, wherein said computer system further includes a third additional hardware resource authentication unit that judges whether or not said new hardware resource is an unfitted hardware resource which potentially has a negative effect on said computer system by comparing the authentication key of said new hardware resource generated by said first authentication key generation unit with the system authentication key at the time of addition of said new hardware resource.

3. The system for managing hardware resources according to claim 2, wherein said computer system further includes:

a booting purpose hardware resource authentication unit that judges whether or not each of the hardware resources detected by said first authentication key generation unit is able to be installed in said computer system by using the authentication key generated by said first authentication key generation unit at the time of booting of said computer system; and a system authentication key generation unit that generates the system authentication key that is the set of the authentication keys of the hardware resources, each of the hardware resources being judged to be able to be installed by said booting purpose hardware resource authentication unit.

4. The system for managing hardware resources according to claim 3, wherein said computer system further includes a hardware resource authentication table in which the authentication key of each of the hardware resources mounted on said computer system is registered, and said booting purpose hardware resource authentication unit judges that the hardware resource for which the authentication key generated by said first authentication key generation unit is registered in the hardware resource authentication table is able to be installed among the hardware resources mounted on said computer system.

5. The system for managing hardware resources according to claim 4, wherein said computer system further includes an authentication key additional registration unit that installs said new hardware resource in said computer system and registers the authentication key of said new hardware resource generated by said first authentication key generation unit in said hardware resource authentication table when it is judged that said new hardware resource is not an unauthorized hardware resource by said first additional hardware resource authentication unit and said new hardware resource is not an unfitted hardware resource which potentially has a negative effect on the computer system by said second and third additional hardware resource authentication unit at the time of addition of said new hardware resource.

6. The system for managing hardware resources according to claim 5, wherein accounting information indicating whether or not accounting to each of the hardware resources mounted on said computer system has been performed is further registered in said hardware resource authentication table, said booting purpose hardware resource authentication unit judges that the hardware resource having accounting information registered in said hardware resource authentication table indicates accounted is able to be installed among the hardware resources mounted on said computer system, and said second authentication key generation unit requests said management server to arrange for the hardware resource and transmit the activation key by generating the installation authentication key including the attribute information included in the authentication key extracted from the system authentication key and new arrangement need indicating information indicating that arranging for the hardware resource is necessary and transmitting the installation authentication key to the management server when the hardware resource having the accounting information registered in said hardware resource authentication table indicating not-accounted does not exist among the hardware resources having the type instructed by said adding instruction and requests transmit the activation key by generating the installation authentication key including the attribute information included in the authentication key of the hardware resource and the new arrangement need indicating information indicating that arranging for the hardware resource is not necessary and transmitting the installation authentication key to the management server when the hardware resource having the accounting information registered in said hardware resource authentication table indicating not-accounted exists.

7. The system for managing hardware resources according to claim 6, wherein the authentication key additional registration unit associates the accounting information indicating accounted with the authentication key and registers the accounting information in the hardware resource authentication table when said authentication key additional registration unit registers the authentication key in said hardware resource authentication table.

8. The system for managing hardware resources according to claim 7, wherein said computer system further includes an accounting key generation unit that generates an accounting key including the same attribute information as the authentication key registered in said hardware resource authentication table by said authentication key additional registration unit and transmits the accounting key to said management server, and said management server further includes an accounting unit that starts accounting to the hardware resource specified by the attribute information included in said accounting key when the accounting key sent from said computer system is received.

9. The system for managing hardware resources according to claim 1, wherein said second authentication key generation unit specifies a physical location that is the most suitable for system performance among physical locations on which the hardware resource having the type instructed by said adding instruction is able to be mounted and generates the installation authentication key including physical location information indicating the specified physical location.

10. The system for managing hardware resources according to claim 1, wherein said second additional hardware resource authentication unit judges whether or not said new hardware resource is an unfitted hardware resource for said computer system by comparing the installation authentication key generated by said second authentication key generation unit with the authentication key of said new hardware resource generated by said first authentication key generation unit at the time of addition of said new hardware resource.

11. The system for managing hardware resources according to claim 1, wherein when the detected hardware resource is a socket, said first authentication key generation unit generates a socket authentication key including revision of BIOS on the socket, a type of the socket, stepping of the socket, the socket's unique ID, operation frequency of the socket, a cache size held in the socket, a physical location number of the socket and a logical number assigned to the socket, when the detected hardware resource is a memory, said first authentication key generation unit generates a memory authentication key including a type, speed, manufacturer/vendor name and a serial number of DIMM with which the memory is configured, and when the detected hardware resource is a CPU, said first authentication key generation unit generates a CPU authentication key including a CPU core number in the socket corresponding to the CPU and a CPU thread number in the CPU core corresponding to the CPU.

12. A computer system, comprising:

hardware;

a first authentication key generation unit implemented at least by the hardware and that detects hardware resources mounted on said computer system and generates authentication keys including attribute information on the detected hardware resources, respectively, each of the authentication keys being for judging whether or not each of the hardware resources is able to be installed in said computer system;

a second authentication key generation unit implemented at least by the hardware and that requests a management server to arrange for the hardware resource and transmit an activation key by extracting the authentication key related to the hardware resource having a type instructed by an adding instruction from a system authentication key that is a set of the authentication keys of hardware resources installed in said computer system, generating an installation authentication key including the attribute information included in the extracted authentication key and transmitting the installation authentication key to the management server;

a first additional hardware resource authentication unit implemented at least by the hardware and that judges whether or not a new hardware resource is an unauthorized hardware resource which is not permitted to be installed by comparing the authentication key of said new hardware resource generated by said first authentication key generation unit with the activation key sent from said management server at the time of addition of said new hardware resource; and a second additional hardware resource authentication unit implemented at least by the hardware and that judges whether or not said new hardware resource is an unfitted hardware resource which potentially has a negative effect on said computer system by comparing the installation authentication key generated by said second authentication key generation unit with the activation key sent from said management server at the time of addition of said new hardware resource.

13. The computer system according to claim 12, further comprising a third additional hardware resource authentication unit that judges whether or not said new hardware resource is an unfitted hardware resource which potentially has a negative effect on said computer system by comparing the authentication key of said new hardware resource generated by said first authentication key generation unit with the system authentication key at the time of addition of said new hardware resource.

14. A method for managing hardware resources, comprising:

detecting hardware resources mounted on a computer system at the time of booting of said computer system and generating authentication keys including attribute information on the detected hardware resources, respectively in said computer system, each of the authentication keys being for judging whether or not each of the hardware resources is able to be installed in said computer system;

requesting a management server to arrange for the hardware resource and transmit an activation key by extracting the authentication key related to the hardware resource having a type instructed by an adding instruction from a system authentication key that is a set of the authentication keys of the hardware resources installed in said computer system, generating an installation authentication key including the attribute information included in the extracted authentication key and transmitting the installation authentication key to the management server in said computer system;

transmitting the activation key including the attribute information included in the installation authentication key sent from said computer system, to said computer system in said management server;

judging whether or not a new hardware resource is an unauthorized hardware resource which is not permitted to be installed by comparing the authentication key of said new hardware resource with the activation key sent from said management server at the time of addition of said new hardware resource in said computer system; and judging whether or not said new hardware resource is an unfitted hardware resource which potentially has a negative effect on said computer system by comparing the installation authentication key with the activation key sent from said management server at the time of addition of said new hardware resource in said computer system.

15. The method for managing hardware resources according to claim 14, further comprising
judging whether or not said new hardware resource is an unfitted hardware resource which potentially has a negative effect on said computer system by comparing the authentication key of said new hardware resource with the system authentication key at the time of addition of said new hardware resource in said computer system.

16. A non-transitory computer readable medium recording thereon a program for causing a computer to function as a part of a system for managing hardware resources, the program causing the computer to function as:
a first authentication key generation unit that detects hardware resources mounted on a computer system and generating authentication keys including attribute information on the detected hardware resources, respectively, each of the authentication keys being for judging whether or not each of the hardware resources is able to be installed in said computer system;
a second authentication key generation unit that requests a management server to arrange for the hardware resource and transmit an activation key by extracting the authentication key related to the hardware resource having a type instructed by an adding instruction from a system authentication key that is a set of the authentication keys of the hardware resources installed in said computer system, generating an installation authentication key including the attribute information included in the extracted authentication key and transmitting the installation authentication key to the management server;
a first additional hardware resource authentication unit that judges whether or not a new hardware resource is an unauthorized hardware resource which is not permitted to be installed by comparing the authentication key of said new hardware resource generated by said first authentication key generation unit with the activation key sent from said management server at the time of addition of said new hardware resource; and
a second additional hardware resource authentication unit that judges whether or not said new hardware resource is an unfitted hardware resource which potentially has a negative effect on said computer system by comparing the installation authentication key generated by said second authentication key generation unit with the activation key sent from said management server at the time of addition of said new hardware resource.

17. The non-transitory computer readable medium according to claim 16, the program further causing the computer to function as
a third additional hardware resource authentication unit that judges whether or not said new hardware resource is an unfitted hardware resource which potentially has a negative effect on said computer system by comparing the authentication key of said new hardware resource generated by said first authentication key generation unit with the system authentication key at the time of addition of said new hardware resource.

18. A system for managing hardware resources, comprising:
a computer system including hardware; and
a management server;
wherein said computer system includes:
first authentication key generation means implemented at least by the hardware and for detecting hardware resources mounted on said computer system and generating authentication keys including attribute information on the detected hardware resources, respectively, each of the authentication keys being for judging whether or not each of the hardware resources is able to be installed in said computer system;
second authentication key generation means implemented at least by the hardware and for requesting said management server to arrange for the hardware resource and transmit an activation key by extracting the authentication key related to the hardware resource having a type instructed by an adding instruction from a system authentication key that is a set of the authentication keys of the hardware resources installed in said computer system, generating an installation authentication key including the attribute information included in the extracted authentication key and transmitting the installation authentication key to said management server;
first additional hardware resource authentication means implemented at least by the hardware and for judging whether or not a new hardware resource is an unauthorized hardware resource which is not permitted to be installed by comparing the authentication key of said new hardware resource generated by said first authentication key generation means with the activation key sent from said management server at the time of addition of said new hardware resource; and
second additional hardware resource authentication means implemented at least by the hardware and for judging whether or not said new hardware resource is an unfitted hardware resource which potentially has a negative effect on said computer system by comparing the installation authentication key generated by said second authentication key generation means with the activation key sent from said management server at the time of addition of said new hardware resource, and
wherein said management server includes:
activation key generation means for transmitting the activation key including the attribute information included in the installation authentication key sent from said computer system, to said computer system.

19. A method for managing hardware resources comprising:
a step for detecting hardware resources mounted on a computer system at the time of booting of said computer system and generating authentication keys including attribute information on the detected hardware resources, respectively in said computer system, each of the authentication keys being for judging whether or not each of the hardware resources is able to be installed in said computer system;
a step for requesting a management server to arrange for the hardware resource and transmit an activation key by extracting the authentication key related to the hardware resource having a type instructed by an adding instruction from a system authentication key that is a set of the authentication keys of the hardware resources installed in said computer system, generating an installation authentication key including the attribute information included in the extracted authentication key and transmitting the installation authentication key to the management server in said computer system;
a step for transmitting the activation key including the attribute information included in the installation authentication key sent from said computer system, to said computer system in said management server;
a step for judging whether or not a new hardware resource is an unauthorized hardware resource which is not permitted to be installed by comparing the authentication key of said new hardware resource with the activation key sent from said management server at the time of addition of said new hardware resource in said computer system; and
a step for judging whether or not said new hardware resource is an unfitted hardware resource which potentially has a negative effect on said computer system by comparing the installation authentication key with the activation key sent from said management server at the time of addition of said new hardware resource in said computer system.

* * * * *